US009403097B2

(12) United States Patent
Yukishita et al.

(10) Patent No.: US 9,403,097 B2
(45) Date of Patent: Aug. 2, 2016

(54) SERVER DEVICE AND NON-TRANSITORY COMPUTER-READABLE STORAGE MEDIUM STORING GAME PROGRAM

(71) Applicant: DeNA Co., Ltd., Tokyo (JP)

(72) Inventors: Shinnosuke Yukishita, Tokyo (JP); Masaki Arizuka, Tokyo (JP); Takashi Ohkubo, Tokyo (JP); Yusuke Sumaki, Tokyo (JP)

(73) Assignee: DENA CO., LTD., Tokyo (JP)

( * ) Notice: Subject to any disclaimer, the term of this patent is extended or adjusted under 35 U.S.C. 154(b) by 224 days.

(21) Appl. No.: 14/157,311

(22) Filed: Jan. 16, 2014

(65) Prior Publication Data

US 2015/0087415 A1 Mar. 26, 2015

(30) Foreign Application Priority Data

Sep. 26, 2013 (JP) .................................. 2013-200091

(51) Int. Cl.
*G06F 17/00* (2006.01)
*A63F 13/63* (2014.01)
*A63F 13/87* (2014.01)
*A63F 13/795* (2014.01)

(52) U.S. Cl.
CPC ............... *A63F 13/63* (2014.09); *A63F 13/795* (2014.09); *A63F 13/87* (2014.09)

(58) Field of Classification Search
USPC .................... 463/9, 10, 16, 17, 21, 22, 30–33
See application file for complete search history.

(56) References Cited

U.S. PATENT DOCUMENTS

| 2008/0076455 A1* | 3/2008 | Kim ................... H04M 1/72552 455/466 |
| 2008/0146337 A1* | 6/2008 | Halonen ............... G07C 15/006 463/42 |
| 2015/0065255 A1* | 3/2015 | Otomo .................. A63F 13/422 463/43 |

FOREIGN PATENT DOCUMENTS

| JP | 2010-162212 A | 7/2010 |
| JP | 2011-000377 A | 1/2011 |
| JP | 2013-099476 A | 5/2013 |
| JP | 2013-165911 A | 8/2013 |

OTHER PUBLICATIONS

Japanese Patent Application No. 2013-200091; Office Action mailed on Nov. 18, 2014.

* cited by examiner

*Primary Examiner* — Ronald Laneau
(74) *Attorney, Agent, or Firm* — Procopio, Cory, Hargreaves & Savitch LLP

(57) ABSTRACT

A server device stores a plurality of first messages and a plurality of second messages to be made available to a player as a result of a use condition being satisfied. The server device generates, if the use condition is not satisfied, a first message list including only the first fixed messages and generates, if the use condition is satisfied, a second message list including at least one of the second fixed messages. In response to a request from a player terminal, the server device generates, before the use condition is satisfied, data of a game screen including a selection operation area allowing a player to select a message from the first message list and generates, after the use condition is satisfied, data of a game screen including a selection operation area allowing a player to select a message from the second message list.

6 Claims, 13 Drawing Sheets

| CHARACTER ID | CHARACTER NAME | RARITY | BASE ATTACK POWER | BASE DEFENSE POWER | BASE HIT POINTS |
|---|---|---|---|---|---|
| 0001 | CHARACTER A | COMMON | 15 | 8 | 10 |
| 0002 | CHARACTER B | UNCOMMON | 30 | 20 | 15 |
| 0003 | CHARACTER C | RARE | 45 | 30 | 25 |
| 0004 | CHARACTER D | SUPER RARE | 60 | 55 | 60 |
| ⋮ | ⋮ | ⋮ | ⋮ | ⋮ | ⋮ |

FIG. 5

| MESSAGE ID | MESSAGE | POINTS |
|---|---|---|
| 001 | Good job! | 0 |
| 002 | Grrr | 0 |
| 003 | See message board please | 0 |
| ⋮ | ⋮ | ⋮ |
| 101 | Hot!! | 10000 |
| 102 | Damn | 50000 |
| 103 | Here it comes | 100000 |
| ⋮ | ⋮ | ⋮ |

FIG. 6

| PLAYER ID | PLAYER NAME | PLAYER'S SCORE | OWNED CHARACTER INFORMATION |
|---|---|---|---|
| 0001 | PLAYER A | 8000 | OWNED CHARACTER INFORMATION (1) |
| 0002 | PLAYER B | 2000 | OWNED CHARACTER INFORMATION (2) |
| 0003 | PLAYER C | 1000 | OWNED CHARACTER INFORMATION (3) |
| 0004 | PLAYER D | 3000 | OWNED CHARACTER INFORMATION (4) |
| 0005 | PLAYER E | 10000 | OWNED CHARACTER INFORMATION (5) |
| 0006 | PLAYER F | 1000 | OWNED CHARACTER INFORMATION (6) |
| . | . | . | . |
| . | . | . | . |
| . | . | . | . |

FIG. 7

| CHARACTER ID | LEVEL | ATTACK POWER | DEFENSE POWER | HIT POINTS | ACQUISITION DATE AND TIME |
|---|---|---|---|---|---|
| 0011 | LV.3 | 15 | 10 | 200 | 2/13/2012 10:00 |
| 0211 | LV.4 | 20 | 23 | 150 | 2/13/2012 12:00 |
| 0133 | LV.1 | 70 | 45 | 100 | 2/14/2012 11:30 |
| 0201 | LV.4 | 22 | 40 | 600 | 2/15/2012 18:00 |
| 0072 | LV.7 | 60 | 50 | 250 | 2/16/2012 13:30 |
| 0094 | LV.1 | 300 | 200 | 450 | 2/16/2012 19:00 |
| . | . | . | . | . | . |

OWNED CHARACTER INFORMATION (1)
OWNED CHARACTER INFORMATION (2)
OWNED CHARACTER INFORMATION (3)

FIG. 8

| TEAM ID | TEAM NAME | TEAM'S SCORE | MEMBER INFORMATION | MESSAGE USE PERMISSION INFORMATION |
|---|---|---|---|---|
| 0001 | TEAM A | 500000 | MEMBER INFORMATION (1) | MESSAGE USE PERMISSION INFORMATION (1) |
| 0002 | TEAM B | 10000 | MEMBER INFORMATION (2) | MESSAGE USE PERMISSION INFORMATION (2) |
| 0003 | TEAM C | 1500 | MEMBER INFORMATION (3) | MESSAGE USE PERMISSION INFORMATION (3) |
| ⋮ | ⋮ | ⋮ | ⋮ | ⋮ |

FIG. 9

MEMBER INFORMATION (3)
MEMBER INFORMATION (2)
MEMBER INFORMATION (1)

| MEMBER ID | ROLE | PLAYER ID |
|---|---|---|
| 1 | LEADER | 0005 |
| 2 | MEMBER | 0010 |
| 3 | MEMBER | 0201 |
| ⋮ | ⋮ | ⋮ |

FIG. 10

| MESSAGE USE PERMISSION INFORMATION (3) | | |
|---|---|---|
| MESSAGE USE PERMISSION INFORMATION (2) | | ON |
| MESSAGE USE PERMISSION INFORMATION (1) | | ON |
| MESSAGE ID | FLAG INFORMATION | |
| 001 | TRUE | |
| 002 | TRUE | |
| 003 | TRUE | |
| ⋮ | ⋮ | |
| 101 | TRUE | |
| 102 | FALSE | |
| 103 | FALSE | |
| ⋮ | ⋮ | |

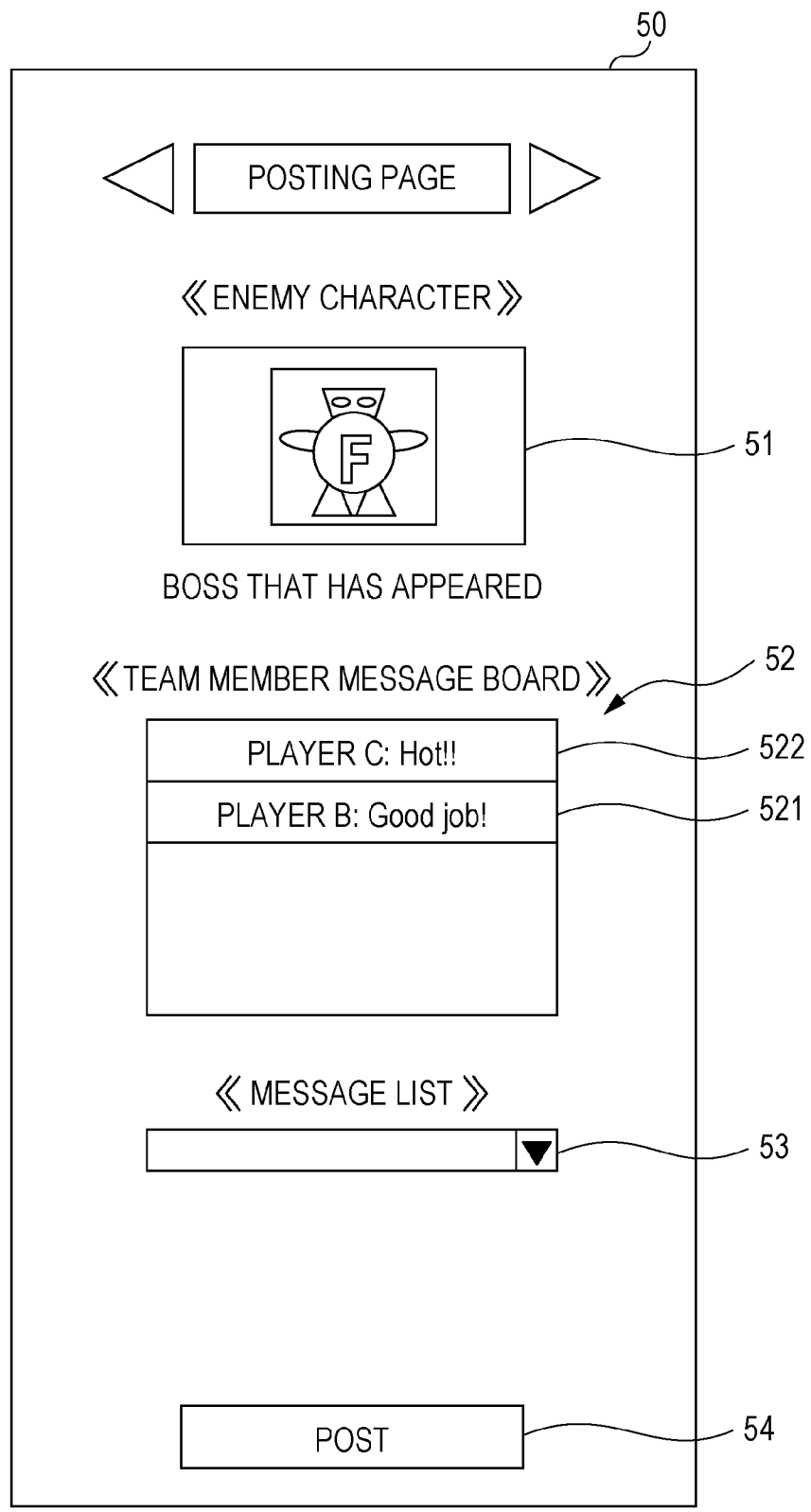

SERVER DEVICE AND NON-TRANSITORY COMPUTER-READABLE STORAGE MEDIUM STORING GAME PROGRAM

BACKGROUND OF THE INVENTION

1. Field of the Invention

The present invention relates to a server device and a non-transitory computer-readable storage medium storing a game program.

2. Description of the Related Art

There are game systems that allow players to exchange messages by allowing the players to select fixed messages from a message list and then displaying the selected fixed messages on a message board (for example, Japanese Unexamined Patent Application Publication No. 2006-149671).

Such systems allow players to easily and rapidly exchange messages by allowing the players to select fixed messages from a message list. However, because the fixed messages included in the message list remain the same, the exchange of messages possibly becomes monotonous and communication between players possibly becomes stagnant.

SUMMARY OF THE INVENTION

The present invention has been made in view of such circumstances, and an aspect of the present invention aims to make communication between players active.

To this end, an aspect of the present invention provides a server device to be connected, via a network, to one or more player terminals each to be used by a player who plays a game, including a memory configured to store a plurality of first fixed messages and a plurality of second fixed messages, each of the first fixed messages being used when a player posts a message, each of the second fixed messages being made available to a player as a result of a use condition being satisfied; a determiner configured to determine whether the use condition is satisfied; a message list generator configured to generate a first message list including only the first fixed messages if the determiner determines that the use condition is not satisfied and to generate a second message list including at least one of the second fixed messages if the determiner determines that use condition is satisfied; and a screen data generator configured to generate, in response to a request from the player terminal, before the use condition is satisfied, screen data used by the player terminal which is a source of the request to display a game screen including a posted message display area in which a message posted by a player is displayed and a selection operation area allowing a player to select a message to be displayed in the posted message display area from the first message list, and after the use condition is satisfied, screen data used by the player terminal which is a source of the request to display a game screen including the posted message display area and a selection operation area allowing a player to select a message to be displayed in the posted message display area from the second message list.

Other features of the present invention will become apparent from the description of the specification and the accompanying drawings.

According to the aspect of the present invention, communication between players may be made active.

BRIEF DESCRIPTION OF THE DRAWINGS

FIG. 5 is a diagram illustrating an example of the data structure of message information;

FIG. 6 is a diagram illustrating an example of the data structure of player information;

FIG. 7 is a diagram illustrating an example of the data structure of owned character information;

FIG. 8 is a diagram illustrating an example of the data structure of team information;

FIG. 9 is a diagram illustrating an example of the data structure of member information;

FIG. 10 is a diagram illustrating an example of the data structure of message use permission information;

FIG. 16 is a diagram illustrating an example of the posting page displayed after a message is posted by the other player.

DESCRIPTION OF THE PREFERRED EMBODIMENTS

Figure 1:
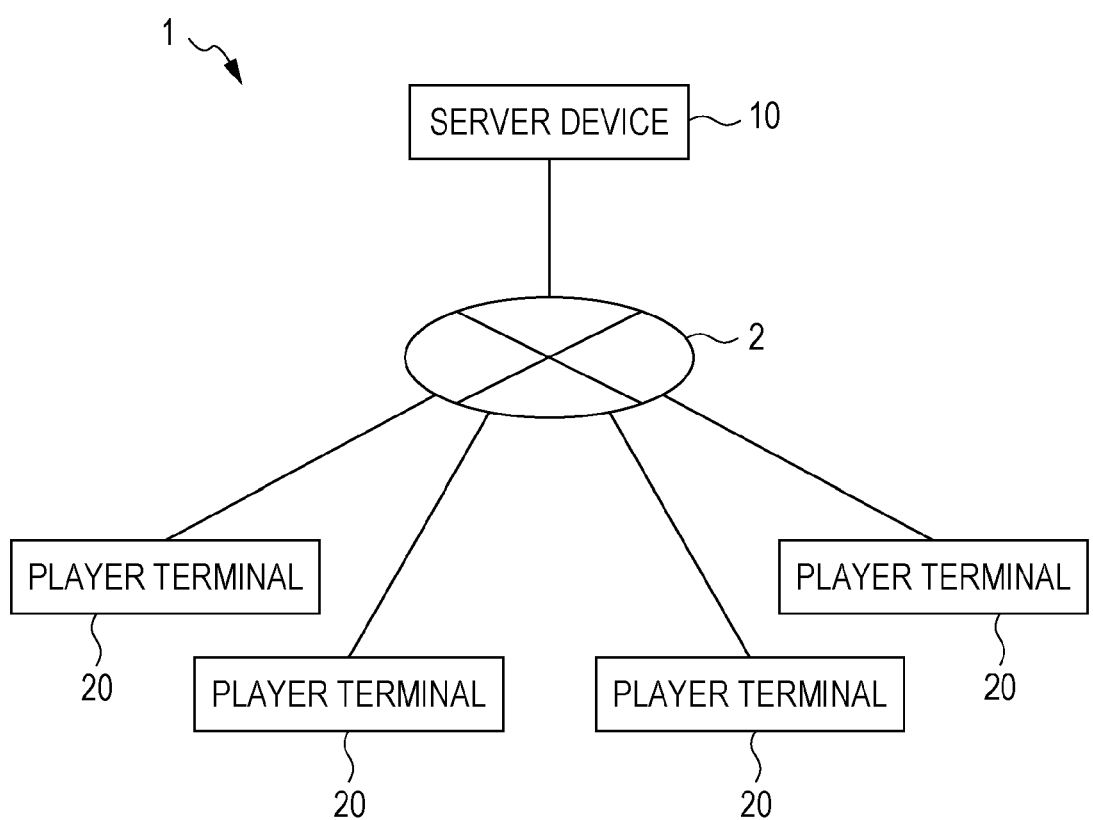
FIG. 1 is a diagram illustrating an example of the overall configuration of a game system.

At least the following will become apparent from the description included in the specification and the accompanying drawings.

Specifically, a server device to be connected, via a network, to one or more player terminals each to be used by a player who plays a game, includes a memory configured to store a plurality of first fixed messages and a plurality of second fixed messages, each of the first fixed messages being used when a player posts a message, each of the second fixed messages being made available to a player as a result of a use condition being satisfied; a determiner configured to determine whether the use condition is satisfied; a message list generator configured to generate a first message list including only the first fixed messages if the determiner determines that the use condition is not satisfied and to generate a second message list including at least one of the second fixed messages if the determiner determines that use condition is satisfied; and a screen data generator configured to generate, in response to a request from the player terminal, before the use condition is satisfied, screen data used by the player terminal which is a source of the request to display a game screen including a posted message display area in which a message posted by a player is displayed and a selection operation area allowing a player to select a message to be displayed in the posted message display area from the first message list, and after the use condition is satisfied, screen data used by the player terminal which is a source of the request to display a game screen including the posted message display area and a selection operation area allowing a player to select a message to be displayed in the posted message display area from the second message list.

Such a server device is capable of making communication between players active.

The memory may store a score achieved by the player. The use condition may be that the score has reached a predetermined value. The determiner may determine whether the score has reached the predetermined value. The message list generator may generate the first message list if the determiner determines that the score has not reached the predetermined value and generate the second message list if the determiner determines that the score has reached the predetermined value.

Such a server device encourages players to positively earn points so as to make communication between the players active.

The memory may store team information regarding a team to which a plurality of players belong and a team's score achieved by the team. The use condition may be that the team's score has reached a predetermined value. The determiner may determine whether the team's score has reached the predetermined value. The message list generator may generate the first message list if the determiner determines that the team's score has not reached the predetermined value and generate the second message list if the determiner determines that the team's score has reached the predetermined value. The screen data generator may generate, in response to a request from the player terminal used by any of the plurality of players belonging to the team, before the use condition is satisfied, screen data used by the player terminal which is a source of the request to display a game screen including the posted message display area and the selection operation area allowing the player to select a message to be displayed in the posted message display area from the first message list, and after the use condition is satisfied, screen data used by the player terminal which is a source of the request to display a game screen including the posted message display area and the selection operation area allowing the player to select a message to be displayed in the posted message display area from the second message list.

Because players belonging to a team cooperate with each other so as to increase the team's score, such a server device is capable of making communication between the players more active.

The memory may store team information regarding a team to which a plurality of players belong and information regarding a player serving as a leader among the plurality of players belonging to the team. The use condition may be that a player of interest belonging to the team is the leader. The determiner may determine whether the player of interest is the leader. The message list generator may generate the first message list if the determiner determines that the player of interest is not the leader and generate the second message list if the determiner determines the player of interest is the leader. The screen data generator may generate, in response to a request from the player terminal used by the player of interest, before the use condition is satisfied, screen data used by the player terminal which is a source of the request to display a game screen including the posted message display area and the selection operation area allowing the player to select a message to be displayed in the posted message display area from the first message list, and after the use condition is satisfied, screen data used by the player terminal which is a source of the request to display a game screen including the posted message display area and the selection operation area allowing the player to select a message to be displayed in the posted message display area from the second message list.

Such a server device encourages each player to positively be a leader so as to make communication between the players active.

The server device may further include a battle processor configured to decide, in response to a request from the player terminal, an outcome of a battle game. The determiner may determine whether a predetermined game state has occurred during the battle game. The screen data generator may automatically generate, if the determiner determines that the predetermined game state has occurred during the battle game, screen data used by the player terminal to display a game screen including the posted message display area in which one of the second fixed messages that corresponds to the predetermined game state that has occurred is displayed.

Because the second fixed message is automatically displayed in the posted message display area upon occurrence of the predetermined game state, such a server device is capable of boosting the exchange of messages between players.

A non-transitory computer-readable storage medium stores a game program causing a computer to execute a process, the process including storing a plurality of first fixed messages and a plurality of second fixed messages, each of the first fixed messages being used when a player posts a message, each of the second fixed messages being made available to a player as a result of a use condition being satisfied; determining whether the use condition is satisfied; generating a first message list including only the first fixed messages if it is determined that the use condition is not satisfied and generating a second message list including at least one of the second fixed messages if it is determined that use condition is satisfied; and generating, before the use condition is satisfied, screen data of a game screen including a posted message display area in which a message posted by a player is displayed and a selection operation area allowing a player to select a message to be displayed in the posted message display area from the first message list, and after the use condition is satisfied, screen data of a game screen including the posted message display area and a selection operation area allowing a player to select a message to be displayed in the posted message display area from the second message list.

Such a game program stored on the non-transitory computer-readable storage medium is capable of making communication between players active.

Embodiment

Configuration of Game System 1

FIG. 1 is a diagram illustrating an example of the overall configuration of a game system 1 according to this embodiment. The game system 1 is configured to provide players with various game-related services via a network 2 (for example, the Internet). The game system 1 includes a server device 10 and a plurality of player terminals 20.

Configuration of Server Device 10

Figure 2:
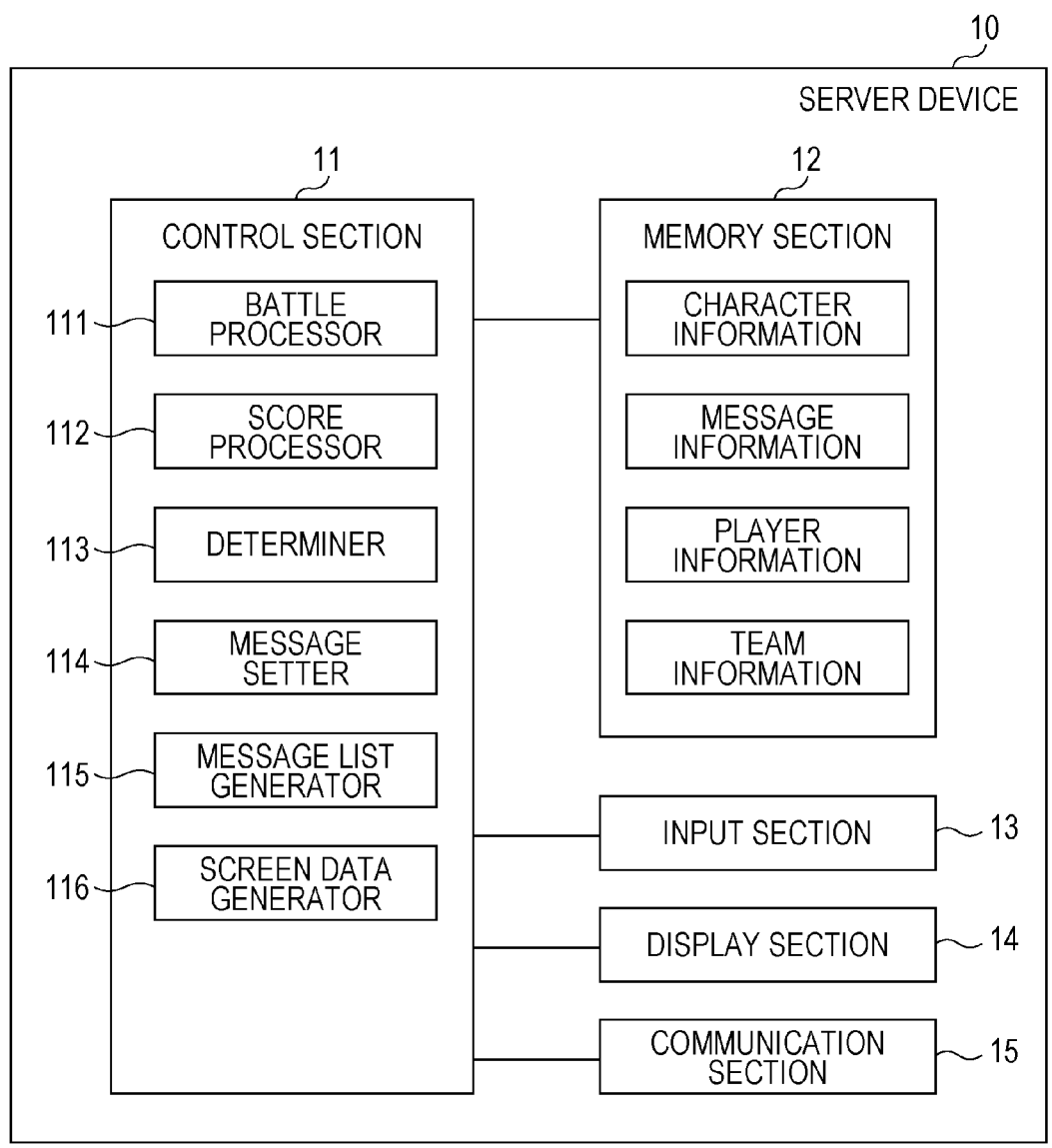
FIG. 2 is a block diagram illustrating the functional configuration of a server device.

FIG. 2 is a block diagram illustrating the functional configuration of the server device 10 according to this embodiment. The server device 10 is an information processing apparatus (for example, a work station or a personal computer) to be used by a system administrator or the like to administrate operation of game-related services. The server device 20 is capable of distributing (as a response) a game program operable in the player terminal 20 or a web page (such as a game screen) created in a markup language (such as Hypertext Markup Language (HTML)) compliant with the specs of the player terminal 20, in response to each of various commands (requests) from the player terminal 20. The server device 10 includes a control section 11, a memory section 12, an input section 13, a display section 14, and a communication section 15.

The control section 11 is configured to transfer data exchanged between the sections and control the server device 10. The control section 11 is implemented as a result of a central processing section (CPU) executing a program stored in a predetermined memory. The control section 11 according to this embodiment includes a battle processor 111, a score processor 112, a determiner 113, a message setter 114, a message list generator 115, and a screen data generator 116.

The battle processor 111 has a function of executing various processes related to a battle game. The battle processor 111 according to this embodiment is configured to execute, in response to a battle request received from the player terminal 20, a process to start a battle game against an enemy character set as an opponent and then decide the outcome of the battle game.

The score processor 112 has a function of executing various processes related to scores. The score processor 112 according to this embodiment is configured to calculate a team's score on the basis of players' scores, for example.

The determiner 113 has a function of executing various determination processes. The determiner 113 according to this embodiment determines, for example, whether a use condition is satisfied. The use condition is a condition based on which a player is permitted to use second fixed messages among first and second fixed messages.

The message setter 114 has a function of executing various processes related to settings for messages. The message setter 114 according to this embodiment makes a setting for permitting a player to use a message and a setting for restricting a player from using a massage.

The message list generator 115 has a function of executing a process of generating a message list including a plurality of messages. The message list generator 115 according to this embodiment is configured to generate a first message list including only the first fixed messages if the use condition is not satisfied and to generate a second message list including at least one of the second fixed messages if the use condition is satisfied.

The screen data generator 116 has a function of executing a process of generating screen data used by the player terminal 20 to display a game screen. The screen data generator 116 according to this embodiment generates HTML data as screen data of a game screen.

The memory section 12 includes a read only memory (ROM) which is a read-only memory area storing a system program, and a random access memory (RAM) which is a rewritable memory area to be used by the control section 11 as a work area for arithmetic processing. The memory section 12 is implemented by, for example, a nonvolatile memory device such as a flash memory or a hard disk. The memory section 12 according to this embodiment stores at least character information which is information regarding characters, message information which is information regarding messages, player information which is information regarding players, and team information which is information regarding teams. These pieces of information will be described in detail later.

The input section 13 is used by the system administrator or the like to input various pieces of data (for example, character information) and is implemented by, for example, a keyboard and a mouse.

The display section 14 is configured to display, in accordance with a command received from the control section 11, an operation screen for the system administrator or the like and is implemented by, for example, a liquid crystal display (LCD).

The communication section 15 is configured to perform communication with the player terminal 20. The communication section 15 has a function of a receiver that receives various pieces of data and various signals transmitted from the player terminal 20 and a function of a transmitter that transmits various pieces of data and various signals to the player terminal 20 in accordance with commands received from the control section 11. The communication section 15 is implemented by, for example, a network interface card (NIC).

Configuration of Player Terminal 20

Figures 3, 4:
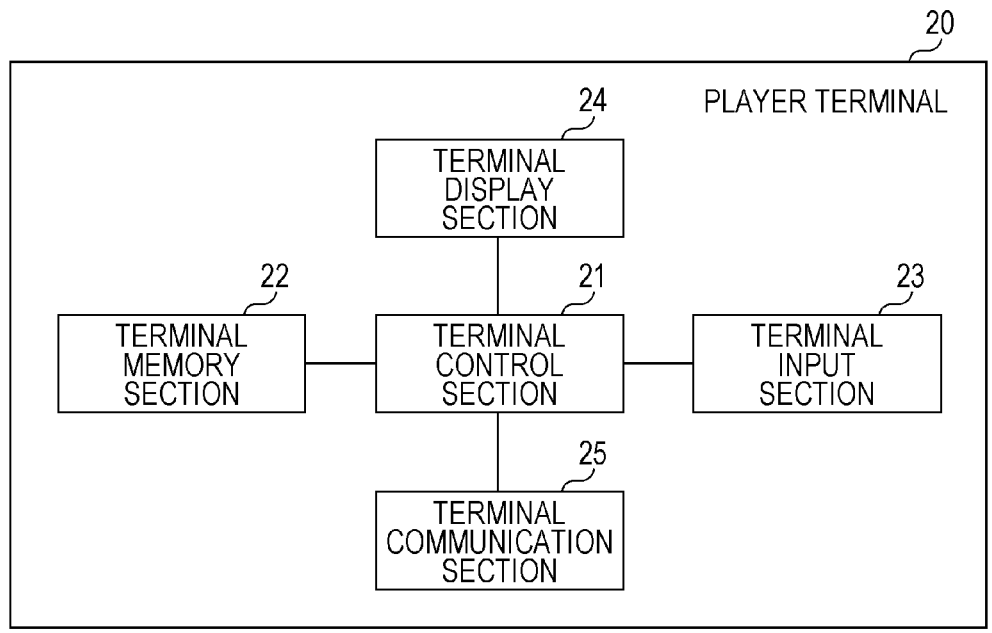
FIG. 3 is a block diagram illustrating the functional configuration of a player terminal.
FIG. 4 is a diagram illustrating an example of the data structure of character information.

FIG. 3 is a block diagram illustrating the functional configuration of the player terminal 20. The player terminal 20 according to this embodiment is an information processing apparatus (for example, a mobile phone terminal, a smartphone, or a tablet terminal) used by a player when the player plays a game. The player terminal 20 is capable of requesting the server device 10 to distribute various pieces of information related to a game (such as a game program and web pages). The player terminal 20 has a web browsing function allowing a player to browse web pages, and thus is capable of displaying web pages (such as game screens) distributed from the server device 10. This player terminal 20 includes a terminal control section 21, a terminal memory section 22, a terminal input section 23, a terminal display section 24, and a terminal communication section 25.

The terminal control section 21 is configured to transfer data exchanged between the sections and control the player terminal 20. The terminal control section 21 is implemented as a result of a CPU executing a program stored in a predetermined memory. The terminal control section 21 according to this embodiment also functions as a screen display control section configured to control a display style of a game screen displayed on the terminal display section 24. The terminal memory section 22 is connected to the terminal control section 21 via a bus. In response to a command received from the terminal control section 21, data stored in the terminal memory section 22 is referred to, read out, or rewritten. This terminal memory section 22 is implemented by, for example, a flash memory or a hard disk. The terminal input section 23 is used by a player to perform various operations (such as game operations) and is implemented by, for example, operation buttons or a touch screen. The terminal display section 24 is configured to display a game screen in accordance with a command received from the terminal control section 21, and is implemented by, for example, an LCD. The terminal communication section 25 functions as a transmitter and receiver that transmits and receives various pieces of information to and from the server device 10 via the network 2, and is implemented by, for example, an NIC.

Data Structures

FIG. 4 is a diagram illustrating an example of the data structure of the character information stored in the memory section 12 of the server device 10. This character information includes items (fields) such as a character ID, a character name, rarity, base attack power, base defense power, and base hit points. The character ID is identification information identifying a character. The character name is information indicating a displayed name of the character. The rarity is a parameter indicating how rare the character is. In this embodiment, one of four rarity levels ("common"→"uncommon"→"rare"→"super rare") is set for each character. The base attack power, base defense power, and base hit points of the character are parameters indicating ability values initially set for the character. Note that the representation of the rarity is not limited to four steps. Also, names different from those assigned to the respective rarity levels may be adopted.

FIG. 5 is a diagram illustrating an example of the data structure of the message information stored in the memory section 12 of the server device 10. This message information includes items such as a message ID, a message, and points. The message ID is identification information identifying a message. The message is information indicating displayed content of the message. The points are information indicating the number of points necessary to use the message. In this embodiment, as the number of points necessary to use a message, zero is set for the first fixed messages (for example, "Good job!") and a non-zero value is set for the second fixed messages (for example, "Hot!!"). That is, unlike the second fixed messages, the first fixed messages are messages which every player is permitted to use all the time.

FIG. 6 is a diagram illustrating an example of the data structure of the player information stored in the memory section 12 of the server device 10. This player information includes items such as a player ID, a player name, player's score, and owned character information. The player ID is identification information identifying a player. The player name is information indicating a displayed name of the player. The player's score is information indicating the number of points earned by the player. The owned character information is information indicating characters owned by the player.

FIG. 7 is a diagram illustrating an example of the data structure of the owned character information. This owned character information includes items such as a character ID, a character's level, attack power, defense power, and hit points, and an acquisition date and time. The character ID is identification information identifying a character owned by the player. The character's level, attack power, defense power, and hit points are parameters indicating the ability values currently set for the character owned by the player. These parameters are updated as the game progresses. The acquisition date and time is information indicating the date and time at which the player acquired the character.

FIG. 8 is a diagram illustrating an example of the data structure of the team information stored in the memory section 12 of the server apparatus 10. This team information includes items such as a team ID, a team name, team's score, member information, and message use permission information. The team ID is identification information identifying a team. The team name is information indicating a displayed name of the team. The team's score is information indicating the number of points earned by the team. In this embodiment, the total sum of the points earned by individual players belonging to the team is used as the team's score. The member information is information regarding members (players) belonging to the team. The message use permission information is information regarding use states of individual messages.

FIG. 9 is a diagram illustrating an example of the data structure of the member information. This member information includes items such as a member ID, a role, and the player ID. The member ID is identification information identifying a member belonging to the team. The role is information indicating the role of the member within the team. In this embodiment, a "leader" indicating the leader of the team and "members" indicating the rest of the team are set. A player who creates a team is set as the "leader" and players who join the team are set as the "members".

FIG. 10 is a diagram illustrating an example of the data structure of the message use permission information. This message use permission information includes items such as the message ID and flag information. The message ID is identification information identifying a message to be used. The flag information is information indicating whether the use of the message is permitted. In this embodiment, "TRUE" is set for the message ID of each message which is made available to players, and "FALSE" is set for the message ID of each message which is not made available to players. Specifically, "TRUE" is set for the first fixed messages all the time. In contrast, regarding the second fixed massages, "TRUE" is set for messages for which the use condition is satisfied and "FALSE" is set for messages for which the use condition is not satisfied.

Overview of Games

Now, the overview of games provided by the game system 1 according to this embodiment will be described. This game system 1 provides a variety of games that are played using electronic game cards (hereinafter, also referred to as "characters") each associated with a corresponding game character.

Battle Game

The game system 1 according to this embodiment is capable of providing a battle game by creating a team constituted by a plurality of players, causing an enemy character serving as the opponent of the team to appear, and letting the plurality of players constituting the team battle against the enemy character so as to decide the outcome of the battle.

During the battle game, each of the players constituting the team is allowed to battle against the enemy character that has appeared by using a character selected from a plurality of characters owned by the player. If the player wins the battle against the enemy character, points are awarded to the team. Because the enemy characters appear one after another, players can earn more points for the team as the players win more battles.

Note that in the battle game, a reward is separately given to a player who contributed to the win. For example, the top five players who inflicted the most damage on the enemy characters are each given a special item, a special character, or the like.

Message Exchange Service

The game system 1 according to this embodiment is capable of providing a message exchange service which enables massages to be exchanged between members of a team by allowing players constituting the team to post messages to a message board.

This message exchange service allows players who join message exchanging to easily and quickly post messages using fixed messages prepared in advance. Types of fixed messages used in this embodiment include ordinary fixed messages which are an example of the first fixed messages and special fixed messages which are an example of the second fixed messages.

The ordinary fixed messages are messages which players are permitted to use all the time. The special fixed messages are messages which players are restricted from using until a use condition is satisfied and which players are permitted to use after the use condition is satisfied. The use condition employed in this embodiment is that the team's score has reached a predetermined value. That is, after the team's score has reached the predetermined value, all players belonging to the team are permitted to use the special fixed messages. This configuration allows each of the players constituting the team to exchange messages using not only the ordinary fixed messages but also the special fixed messages, and consequently may make communication between the members of the team active.

Operations of Game System 1

In the game system 1 according to this embodiment, the control section 11 of the server device 10 controls each of control-target functional sections in accordance with a game program stored in the memory section 12, thereby executing a battle game process and a message exchange process. The following describes each of the processes.

Battle Game Process

Figure 11:
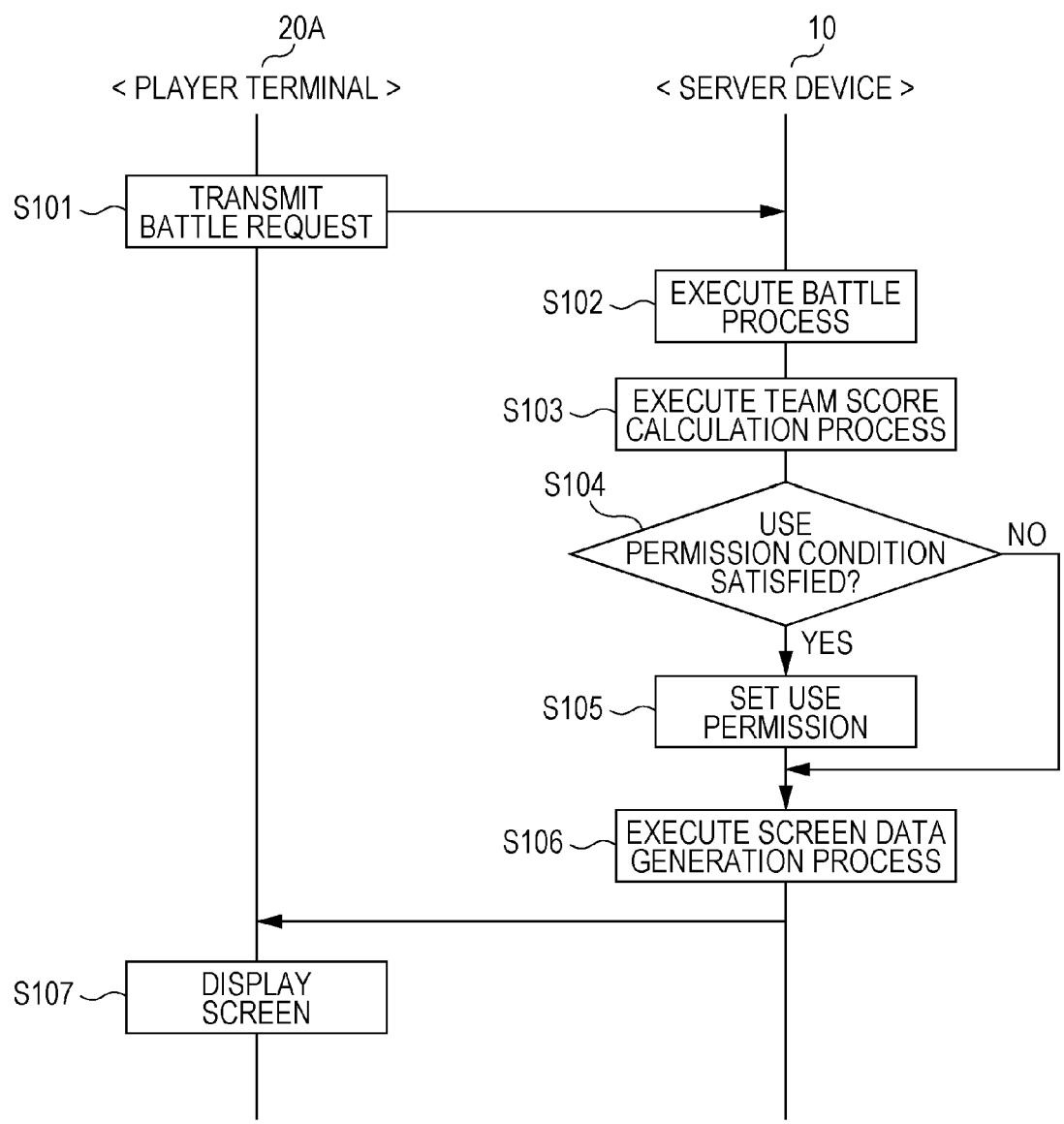
FIG. 11 is a flowchart illustrating a battle game process.

FIG. 11 is a flowchart for explaining the battle game process according to this embodiment. The following describes a case where a player (referred to as a "player A") of a plurality of players belonging to a team battles against the enemy character that has appeared. Note that a player terminal 20A is a terminal used by the player A.

First, in the player terminal 20A, upon receiving via the terminal input section 23 an operation to start a battle game entered by the player A, the terminal control section 21 transmits a request command to start a battle game (battle request) to the server device 10 via the terminal communication section 25 (S101).

Upon receiving the battle request transmitted from the player terminal 20A, the server device 10 executes a battle process (S102). Specifically, the battle processor 111 executes a process of selecting a player character by referring to the owned character information illustrated in FIG. 7 and of causing the player's character to battle against an enemy character that has appeared. More specifically, the battle processor 111 acquires various parameters (such as the attack power, the defense power, and the hit points) set for the player's character by referring to the owned character information illustrated in FIG. 7. The battle processor 111 also acquires various parameters (such as the attack power, the defense power, and the hit points) set for the enemy character by referring to the character information illustrated in FIG. 4. Then, based on the various parameters of the player's character and the enemy character, the battle processor 111 decides the outcome of the battle between these characters. If the battle processor 111 decides that the player wins, the score processor 112 decides points to be awarded to the player A based on the battle result, awards the decided points to the player A, and updates the player information illustrated in FIG. 6.

After the player A is awarded the points based on the battle result in this way, the server device 10 executes a team score calculation process (S103). Specifically, the score processor 112 identifies a team to which the player A belongs by referring to the team information illustrated in FIG. 8 and the member information illustrated in FIG. 9, adds the points that the player A is awarded based on the battle result to the score of this team, and updates the team information illustrated in FIG. 8.

After the score of the team to which the player A belongs is calculated in this manner, the server device 10 determines whether the use condition is satisfied (S104). Specifically, the determiner 113 identifies the score of the team to which the player A belongs by referring to the team information illustrated in FIG. 8. The determiner 113 also identifies points set for each of the special fixed messages among the ordinary fixed messages (assigned the messages IDs of 001, 002, 003, . . . ) and the special fixed messages (assigned the message IDs of 101, 102, 103, . . . ) by referring to the message information illustrated in FIG. 5. Then, the determiner 113 compares the team's score with the points set for each of the special fixed messages so as to determine whether the team's score has reached the points set for the special fixed message. If it is determined that the team's score has reached the points set for any of the special fixed messages (YES in S104), a setting for permitting the use of the special fixed message is made (S105). Specifically, the message setter 114 sets "TRUE" for the flag information of the special fixed message, and updates the message use permission information illustrated in FIG. 10. In this way, not only the player A but also all the players belonging to the team to which the player A belongs are permitted to use the special fixed message. On the other hand, if it is determined that the team score has not reached any of the points set for the special fixed messages (NO in step S104), the process proceeds to step S106.

The server device 10 then causes the screen data generator 116 to generate screen data used by the player terminal 20A to display a game screen related to the battle game (such as a presentation screen of the current battle state or the battle result) (S106). Then, the server device 10 transmits, via the network 2, the generated screen data of the game screen related to the battle game to the player terminal 20A which has transmitted the battle request.

Upon receiving this screen data transmitted from the server device 10, the player terminal 20A analyzes the screen data and causes the terminal display section 24 to display the game screen related to the battle game (S107). In this way, the player A is able to check the current battle state, the battle result, or the like by viewing the game screen displayed on the terminal display section 24.

Message Exchange Process

Figure 12:
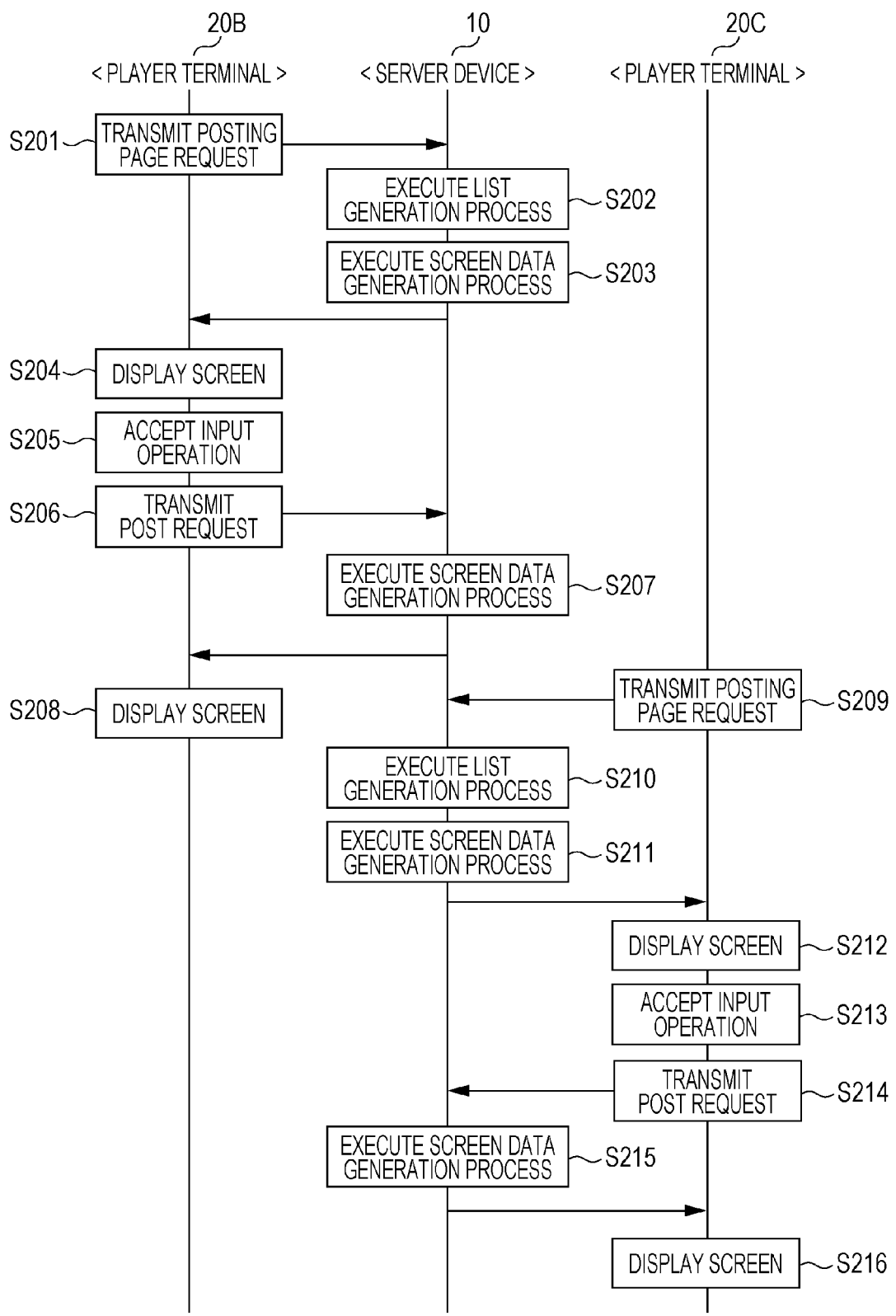
FIG. 12 is a flowchart illustrating a message exchange process.

FIG. 12 is a flowchart for explaining the message exchange process according to this embodiment. The following describes a case where one player (referred to as a "player B") and another player (referred to as a "player C") among a plurality of players belonging to a team exchange messages. Note that a player terminal 20B is a terminal used by the player B and a player terminal 20C is a terminal used by the player C.

First, a description will be given of a case where the player B posts a message before the use condition is satisfied.

In the player terminal 20B, upon receiving via the terminal input section 23 an operation to post a message entered by the player B before the use condition is satisfied, the terminal control section 21 transmits a request command for a posting page (posting page request) to the server device 10 via the terminal communication section 25 (S201).

Upon receiving the posting page request transmitted from the player terminal 20B, the server device 10 executes a list generation process (S202). Specifically, the message list generator 115 identifies a team to which the player B belongs on the basis of the team information illustrated in FIG. 8 and the member information illustrated in FIG. 9, and identifies the message use permission information associated with the team. Then, the message list generator 115 refers to the message use permission information illustrated in FIG. 10. If "FALSE" is set for all the special fixed messages (if the use condition is not satisfied), the message list generator 115 generates an ordinary message list (first message list) including only the ordinary fixed messages. If "TRUE" is set for any of the special fixed messages (if the use condition is satisfied), the message list generator 115 generates a special message list (second message list) including at least the special fixed message. In this example, because the use condition is not satisfied, the message list generator 115 generates the ordinary message list.

Then, the server device 10 executes the screen data generation process (S203). Specifically, the screen data generator 116 generates screen data used by the player terminal 20B to display a posting page on which the player B is to post a message. The server device 10 then transmits, via the communication section 15, this screen data generated by the screen data generator 116 to the player terminal 20B which has transmitted the posting page request.

Upon receiving this screen data transmitted from the server device 10, the player terminal 20B analyzes the screen data and causes the terminal display section 24 to display the posting page corresponding to the screen data (S204).

Figure 13:
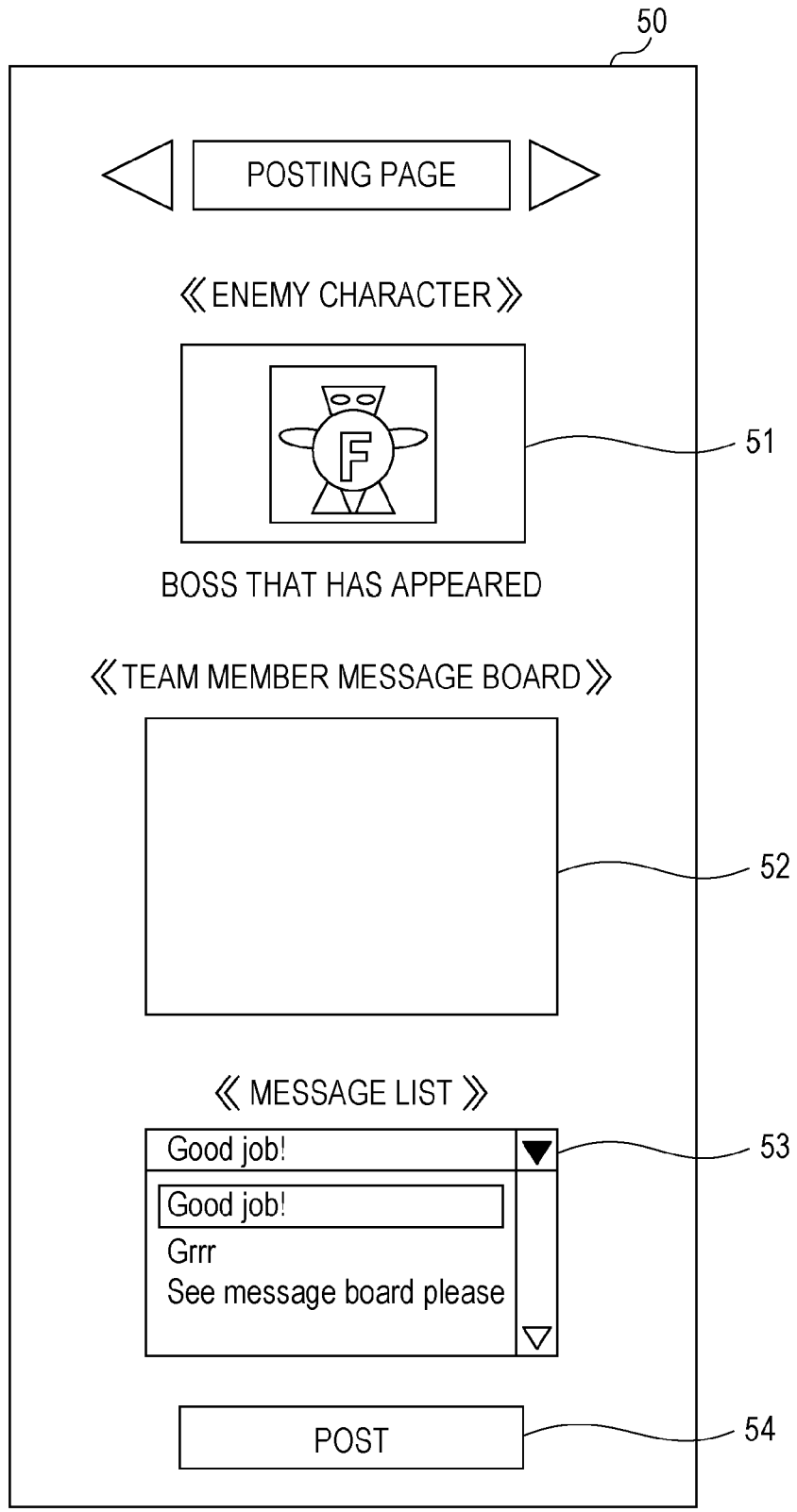
FIG. 13 is a diagram illustrating an example of a posting page displayed before a message is posted by a player.

FIG. 13 is a diagram illustrating an example of a posting page 50 displayed on this terminal display section 24. This posting page 50 includes an enemy character display area 51, a posted message display area 52, a message selection operation area 53, and a post button 54. The enemy character display area 51 is an area in which a common enemy character for all players belonging to the team is displayed. The posted message display area 52 is an area equivalent to a message board on which messages are exchanged between the players belonging to the team. The message selection operation area 53 includes a pull-down menu allowing the player B to select a message to be posted on the posted message display area 52 from the list. In this example, because the use condition is not satisfied, the player B selects a message to be posted on the posted message display area 52 from the ordinary message list displayed in the message selection operation area 53. The post button 54 is an operation button used to enter a message selected by the player B from the ordinary message list (see FIG. 5) displayed in the message selection operation area 53.

Referring back to FIG. 12, upon accepting from the player B an operation to select a message to be posted on the posted message display area 52 from the ordinary message list and an operation to select the post button 54 when this posting page 50 is displayed on the terminal display section 24 (S205), the player terminal 20B transmits a request command to post the message (post request) to the server device 10 via the terminal communication section 25 on the basis of such operation information (S206).

Upon receiving the post request transmitted from the player terminal 20B, the server device 10 executes the screen data generation process (S207). Specifically, the screen data generator 116 generates screen data used by the player terminal 20B to display the posting page displayed after the message is posted by the player B. Then, the server device 10 transmits, via the communication section 15, this screen data generated by the screen data generator 116 to the player terminal 20B which has transmitted the post request.

Upon receiving this screen data transmitted from the server device 10, the player terminal 20B analyzes the screen data and causes the terminal display section 24 to display the posting page corresponding to the screen data (S208).

Figure 14:
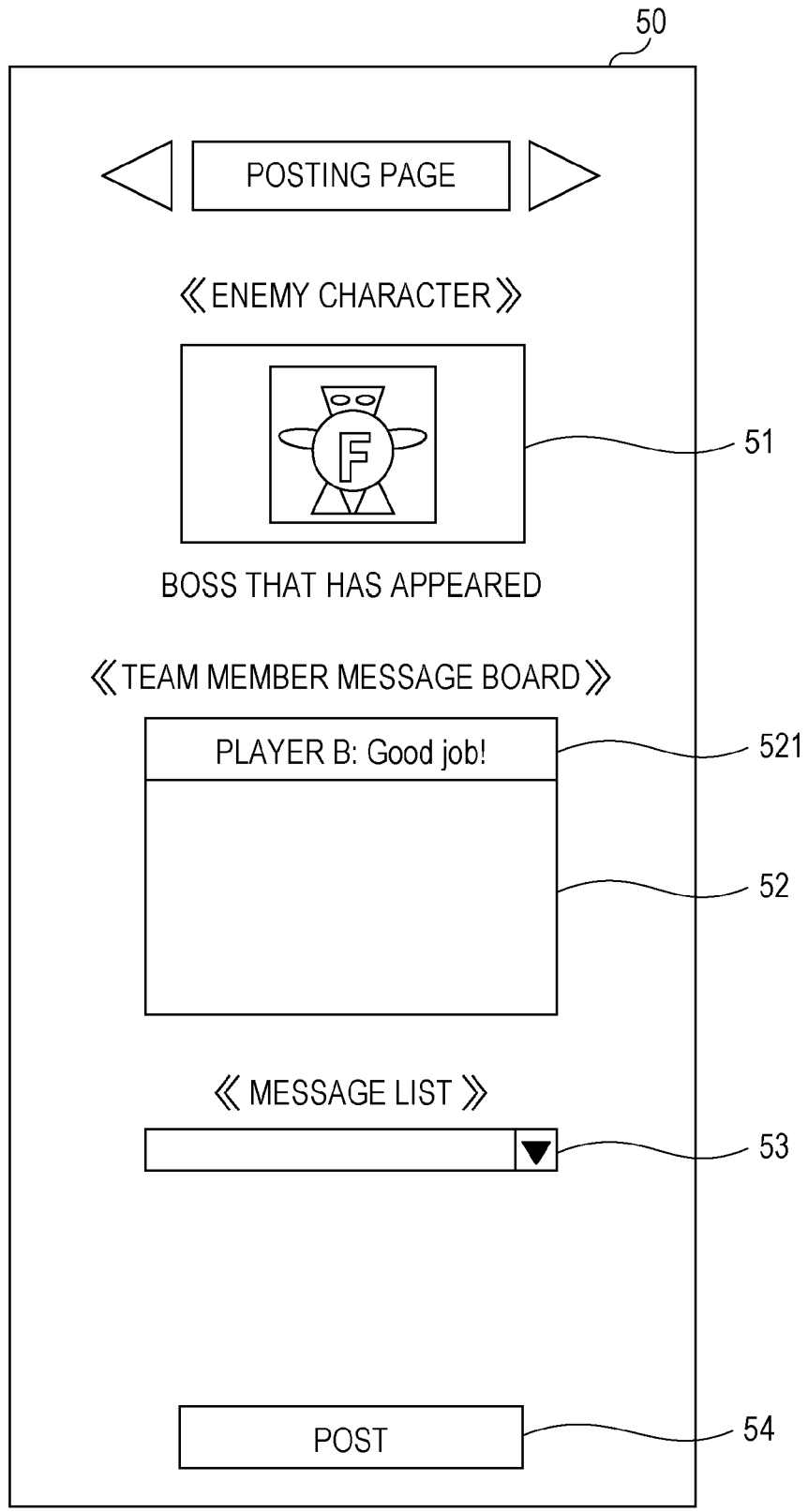
FIG. 14 is a diagram illustrating an example of the posting page displayed after a message is posted by the player.

FIG. 14 is a diagram illustrating an example of the posting page 50 displayed on this terminal display section 24. In the posted message display area 52 of this posting page 50, an ordinary fixed message 521 selected by the player B from the ordinary message list is displayed. Accordingly, the player B is able to confirm that his/her message has been posted on the message board. Also, other members of the team to which the player B belongs are able to view the message posted by the player B by accessing this posting page 50.

Next, the following describes a case where the player C posts a message after the use condition is satisfied.

In the player terminal 20C, upon receiving via the terminal input section 20 an operation to post a message entered by the player C after the use condition is satisfied, the terminal control section 21 transmits a request command for a posting page (posting page request) to the server device 10 via the terminal communication section 25 (S209).

Upon receiving the posting page request transmitted from the player terminal 20C, the server device 10 executes the list generation process (S210). Specifically, the message list generator 115 identifies a team to which the player C belongs on the basis of the team information illustrated in FIG. 8 and the member information illustrated in FIG. 9, and identifies message use permission information associated with the team. At this time, the use condition is satisfied. Thus, the message list generator 115 generates the special message list (second message list) including at least the special fixed message associated with the flag information set as "TRUE" by referring to the message use permission information illustrated in FIG. 10.

Then, the server device 10 executes the screen data generation process (S211). Specifically, the screen data generator 116 generates screen data used by the player terminal 20C to display a posting page on which the player C is to post a message. Then, the server device 10 transmits, via the communication section 15, this screen data generated by the screen data generator 116 to the player terminal 20C which has transmitted the posting page request.

Upon receiving this screen data transmitted from the server device 10, the player terminal 20C analyzes the screen data and causes the terminal display section 24 to display the posting page corresponding to the screen data (S212).

Figure 15:
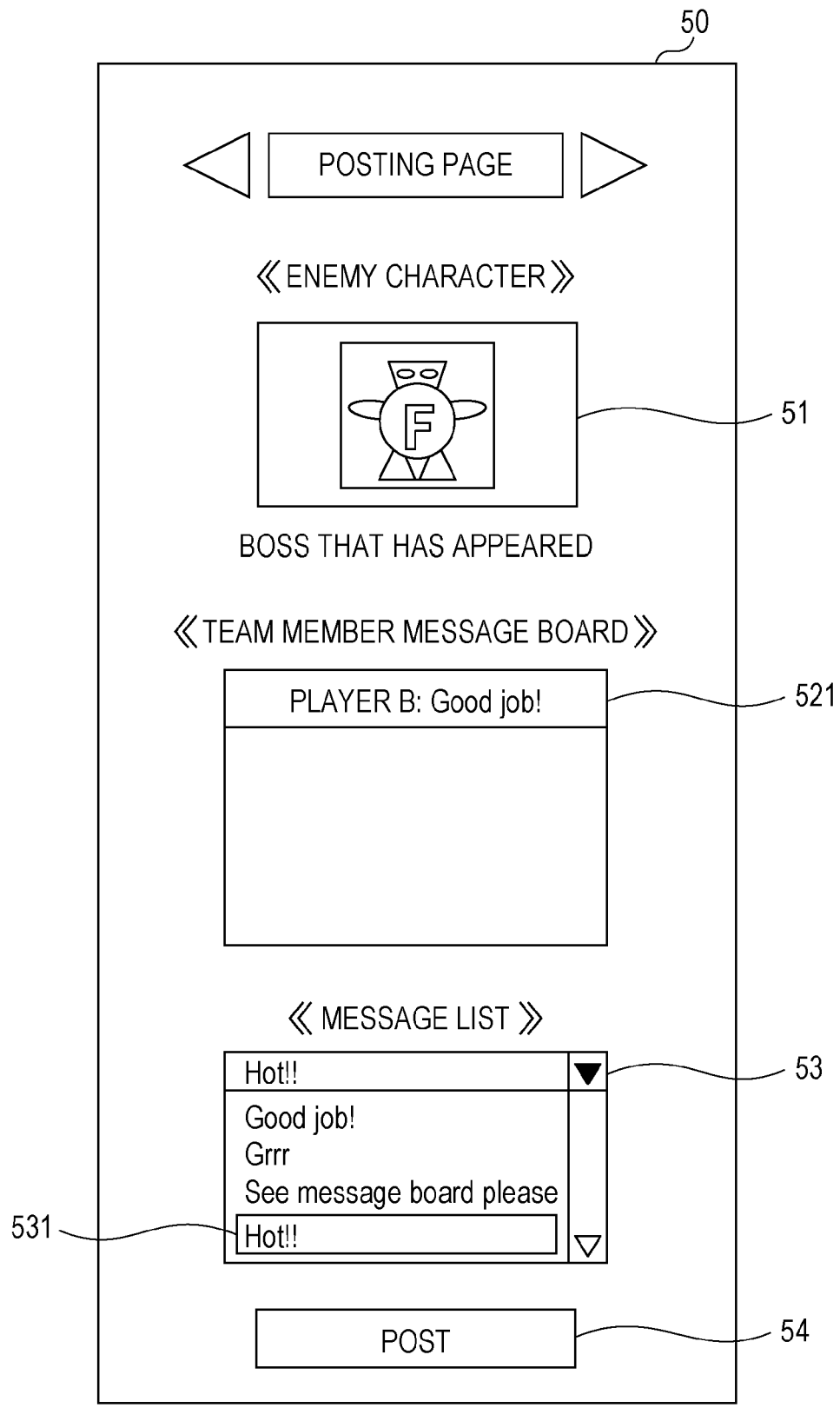
FIG. 15 is a diagram illustrating an example of the posting page displayed before a message is posted by another player.

FIG. 15 is a diagram illustrating an example of the posting page 50 displayed on this terminal display section 24. In the posted message display area 52 of this posting page 50, the ordinary fixed message 521 that has been already posted by the player B is displayed. Also, because the use condition is satisfied, the special message list including the ordinary fixed messages (for example, "Good job!", see FIG. 5) and the special fixed message (for example, "Hot!!", see FIG. 5) is displayed in the message selection operation area 53. Thus, the player C selects a message to be posted on the posted message display area 52 from this special message list. It is assumed here that a special fixed message 531 "Hot!!" is selected by the player C.

Referring back to FIG. 12, upon accepting from the player C an operation to select a message to be posted on the posted message display area 52 from the special message list and an operation to select the post button 54 when this posting page 50 is displayed on the terminal display section 24 (S213), the player terminal 20C transmits a request command to post the message (post request) to the server device 10 via the terminal communication section 25 on the basis of such operation information (S214).

Upon receiving the post request transmitted from the player terminal 20C, the server device 10 executes the screen data generation process (S215). Specifically, the screen data generator 116 generates screen data used by the player terminal 20C to display the posting page displayed after the message has been posted by the player C. Then, the server device 10 transmits, via the communication section 15, this screen data generated by the screen data generator 116 to the player terminal 20C which has transmitted the post request.

Upon receiving this screen data transmitted from the server device 10, the player terminal 20C analyzes the screen data and causes the terminal display section 24 to display the posting page corresponding to the screen data (S216).

FIG. 16 is a diagram illustrating an example of the posting page 50 displayed on this terminal display section 24. In the posted message display area 52 of this posting page 50, a special fixed message 522 selected by the player C from the special message list is displayed above the ordinary fixed message 521 that has been already posted by the player B. Accordingly, the player C is able to confirm that his/her message has been posted on the message board. Also, other members of the team to which the player C belongs are able to view the message posted by the player C by accessing this posting page 50.

As described above, when a certain player belonging to a team earns points as a result of playing a battle game against an enemy character that is a common enemy of all players of the team, the points earned by the player are reflected in the team's score. The battle game is repeatedly played by each player of the team. If the team's score has reached a predetermined value, it is determined that the use condition is satisfied. After the team's score has reached the predetermined value, all the players belonging to the team are permitted to exchange messages by using not only the ordinary fixed messages but also the special fixed messages. Accordingly, the game system 1 according to this embodiment is capable of making communication between the members of the team active.

Other Embodiments

The above embodiment has been described to make it easier to understand the present invention and should not be construed as limitations of the present invention. The present invention may be modified and improved without departing from the gist thereof and also encompasses equivalents thereof. In particular, the present invention also encompasses embodiments to be described below.
Use Condition The above embodiment has described, as an example, the use condition that the team's score has reached a predetermined value; however, the present invention is not limited to this particular use condition.

For example, a condition that player's score that has been achieved as a result of a player playing battle games has reached a predetermined value may be used as the use condition. In this case, the use of special fixed messages may be permitted only for this player. Specifically, if the determiner 113 determines that the player's score has not reached the predetermined value, the message list generator 115 generates the ordinary message list (first message list). If the determiner 113 determines that the player's score has reached the predetermined value, the message list generator 115 generates the special message list (second message list).

Alternatively, for example, a condition that a player belonging to a team becomes the "leader" of the team may be used as the use condition. In this case, the use of the special fixed messages is permitted only for the player who is the "leader". This configuration allows the player who is the "leader" to use exclusive messages for the leader after the use condition is satisfied. Specifically, the determiner 113 determines whether a player belonging to a team is the "leader" by referring to the member information illustrated in FIG. 9. If the determiner 113 determines that the player is not the "leader", the message list generator 115 generates the ordinary message list (first message list). If the determiner 113 determines that the player is the "leader", the message list generator 115 generates the special message list (second message list).

Alternatively, for example, a condition that a team wins a battle game against an opponent team as a result of playing a battle between teams may be used as the use condition. In this case, the use of the special fixed messages may be permitted only for players belonging to a team that has won. Specifically, if the determiner 113 determines that the team has lost a battle held between teams, the message list generator 115 generates the ordinary message list (first message list). If the determiner 113 determines that the team has won a battle held between teams, the message list generator 115 generates the special message list (second message list).

Alternatively, for example, occurrence of a predetermined game state during a battle game may be used as the use condition. The predetermined game state may be, for example, that the player's character has performed a special attack (for example, a special move) during the battle, the player's character becomes ready to use the special attack during the battle, or a parameter set for the player's character has reached a predetermined value as a result of power-up. Specifically, the determiner 113 determines whether a predetermined game state has occurred during a battle game in the battle game process. If the predetermined game state has not occurred, the message list generator 115 generates the ordinary message list (first message list). If the predetermined game state has occurred, the message list generator 115 generates the special message list (second message list).

Alternatively, for example, occurrence of a predetermined game state as a result of playing a lottery game in which a player is rewarded with a character selected from a plurality of characters may be set as the use condition. The predetermined game state may be, for example, that a player is rewarded with a special character (such as a character with the highest rarity) as a result of the lottery game. Specifically, the determiner 113 determines whether a predetermined game state has occurred as a result of playing a lottery game. If the predetermined game state has not occurred, the message list generator 115 generates the ordinary message list (first message list). If the predetermined game state has occurred, the message list generator 115 generates the special message list (second message list).

Alternatively, in the case where an event is held for a limited period and a battle game is performed during this event period, a condition that a predetermined date and time has come after the start of the event may be used as the use condition. Specifically, the determiner 113 determines whether the current date and time is the predetermined date and time. If the current date and time is before the predetermined date and time, the message list generator 115 generates the ordinary message list (first message list). If the current date and time is behind the predetermined date and time, the message list generator 115 generates the special message list (second message list).
Fixed Messages The above embodiment has described the configuration that allows players to post messages by using fixed messages (ordinary and special fixed messages). The fixed messages are not limited to character-represented messages such as text, and may be image-represented messages such as emoticons.

Also, in the above embodiment, the fixed messages may include a free text portion. For example, a fixed message such as "Hi, I'm XX." may be used. In this case, control is performed so that the "player name" or the like is automatically substituted into "XX".

Alternatively, in the above embodiment, fixed messages may be each created by combining two or more words prepared in advance and the player may be prompted to select one of the created fixed messages. This configuration does increase variations of the fixed messages.
Posted Message Display Area 52

The above embodiment has described, as an example, the case where a new message is displayed above an old message when messages are displayed in the posted message display area 52 just like in the posting page 50 illustrated in FIG. 16; however, the present invention is not limited to this configuration. For example, posted messages may be sequentially displayed in the posted message display area 52 one by one. Specifically, the player terminal 20 receives, from the server device 10, message board information which includes, for each message, the player ID of a player who has posted the message, the date and time at which the player has posted the message, and content of the posted message. Based on the message board information, the player terminal 20 displays the messages in the posted message display area 52 one by one in the posted order.

Also, in the above embodiment, a message display area different from the posted message display area 52 may be separately provided. Control may be performed so that only the latest posted fixed message is displayed in this message display area or so that only the most frequently posted fixed message (the most frequently selected fixed message) is displayed. With this configuration, this message display area serves as a headline, which consequently allows players to grasp the message posting state at a glance. Also, members of the team come to pay attention to the message displayed in this message area, which consequently provides a player involved in the message with a feeling of satisfaction.

Message Selection Operation Area 53

The above embodiment has described, as an example, the case where the player is allowed to select one fixed message from one pull-down menu (from the ordinary message list or special message list) in the message selection operation area 53; however, the present invention is not limited to this configuration. For example, the player may be allowed to select one fixed message from each of a plurality of pull-down menus in the message selection operation area 53. Specifically, the player is allowed to select the subject from a first pull-down menu and to select the verb from a second pull-down menu. This configuration allows the player to enjoy creating a sentence by combing a plurality of options.

Server Device

The above embodiment has described, as an example, the game system 1 including one server device 10 which serves as an example of a server device; however, the present invention is not limited to this configuration and the game system 1 may include a plurality of server devices 10 which serve as an example of the server device. Specifically, the plurality of server devices 10 may be connected to one another via the network 2 so as to perform various processes in a distributed manner. Note that the server device 10 is an example of a computer.

Information Processing Apparatus

The above embodiment has described the game system 1 in which the server device 10 and the player terminal 20 operate in cooperation with each other based on a game program so as to execute various information processing processes; however, the present invention is not limited to this configuration and the player terminal 20 alone which serves as an information processing apparatus or the server device alone may execute the various information processing processes based on the game program.

Alternatively, some of functions of the information processing apparatus may be implemented in the player terminal 20. In this case, the server device 10 and the player terminal 20 constitute the information processing apparatus.

Note that the information processing apparatus is an example of a computer.

Game Program

The above embodiment has described the game system 1 in which the server device 10 and the player terminal 20 operate in cooperation with each other to execute various information processing processes. The present invention also encompasses the game program causing these processes to be executed. That is, the server device 10 serving as an information processing apparatus and the player terminal 20 are caused to execute the above-described various processes on the basis of the game program.

What is claimed is:

1. A server device to be connected, via a network, to one or more player terminals each to be used by a player who plays a game, comprising:
   a memory configured to store a plurality of first fixed messages and a plurality of second fixed messages, each of the first fixed messages being used when a player posts a message, each of the second fixed messages being made available to a player as a result of a use condition being satisfied;
   a determiner configured to determine whether the use condition is satisfied;
   a message list generator configured to generate a first message list including only the first fixed messages if the determiner determines that the use condition is not satisfied and to generate a second message list including at least one of the second fixed messages if the determiner determines that use condition is satisfied; and
   a screen data generator configured to generate on a touch screen of the player terminal, in response to a request from the player terminal,
   before the use condition is satisfied, screen data used by the player terminal which is a source of the request to display a game screen including a posted message display area in which a message posted by a player is displayed and a selection operation area allowing a player to select a message to be displayed in the posted message display area from the first message list through an operation on the touch screen, and
   after the use condition is satisfied, screen data used by the player terminal which is a source of the request to display a game screen including the posted message display area and a selection operation area allowing a player to select a message to be displayed in the posted message display area from the second message list through an operation on the touch screen.

2. The server device according to claim 1, wherein the memory stores a score achieved by the player, the use condition is that the score has reached a predetermined value, the determiner determines whether the score has reached the predetermined value, and the message list generator generates the first message list if the determiner determines that the score has not reached the predetermined value and generates the second message list if the determiner determines that the score has reached the predetermined value.

3. The server device according to claim 1, wherein the memory stores team information regarding a team to which a plurality of players belong and a team's score achieved by the team, the use condition is that the team's score has reached a predetermined value, the determiner determines whether the team's score has reached the predetermined value,
   the message list generator generates the first message list if the determiner determines that the team's score has not reached the predetermined value and generates the second message list if the determiner determines that the team's score has reached the predetermined value, and
   the screen data generator generates, in response to a request from the player terminal used by any of the plurality of players belonging to the team,
   before the use condition is satisfied, screen data used by the player terminal which is a source of the request to display a game screen including the posted message display area and the selection operation area allowing the player to select a message to be displayed in the posted message display area from the first message list, and
   after the use condition is satisfied, screen data used by the player terminal which is a source of the request to display a game screen including the posted message display area and the selection operation area allowing the player to select a message to be displayed in the posted message display area from the second message list.

4. The server device according to claim 1, wherein the memory stores team information regarding a team to which a plurality of players belong and information regarding a player serving as a leader among the plurality of players belonging to the team, the use condition is that a player of interest belonging to the team is the leader, the determiner determines whether the player of interest is the leader, the message list generator generates the first message list if the determiner determines that the player of interest is not the leader and generates the second message list if the determiner determines the player of interest is the leader, and the screen data generator generates, in response to a request from the player terminal used by the player of interest, before the use condition is satisfied, screen data used by the player terminal which is a source of the request to display a game screen including the posted message display area and the selection operation area allowing the player to select a message to be displayed in the posted message display area from the first message list, and after the use condition is satisfied, screen data used by the player terminal which is a source of the request to display a game screen including the posted message display area and the selection operation area allowing the player to select a message to be displayed in the posted message display area from the second message list.

5. The server device according to claim 1, further comprising a battle processor configured to decide, in response to a request from the player terminal, an outcome of a battle game, wherein the determiner determines whether a predetermined game state has occurred during the battle game, and the screen data generator automatically generates, if the determiner determines that the predetermined game state has occurred during the battle game, screen data used by the player terminal to display a game screen including the posted message display area in which one of the second fixed messages that corresponds to the predetermined game state that has occurred is displayed.

6. A non-transitory computer-readable storage medium storing a game program causing a computer to execute a process, the process comprising:

storing a plurality of first fixed messages and a plurality of second fixed messages, each of the first fixed messages being used when a player posts a message, each of the second fixed messages being made available to a player as a result of a use condition being satisfied;

determining whether the use condition is satisfied;

generating a first message list including only the first fixed messages if it is determined that the use condition is not satisfied and generating a second message list including at least one of the second fixed messages if it is determined that use condition is satisfied; and generating, before the use condition is satisfied, screen data of a game screen on a touch screen of the player terminal including a posted message display area in which a message posted by a player is displayed and a selection operation area allowing a player to select a message to be displayed in the posted message display area from the first message list through an operation on the touch screen, and after the use condition is satisfied, screen data of a game screen including the posted message display area and a selection operation area allowing a player to select a message to be displayed in the posted message display area from the second message list through an operation on the touch screen.

* * * * *